U. M NORTON.
SCREEN AND PLATE HOLDER FOR ENGRAVERS' CAMERAS.
APPLICATION FILED MAR. 20, 1907.

982,294.

Patented Jan. 24, 1911.

2 SHEETS—SHEET 1.

Witnesses
Otto E. Hoddick.
Dena Nelson.

Inventor
U. M. Norton.
By A. J. O'Brien
Attorney

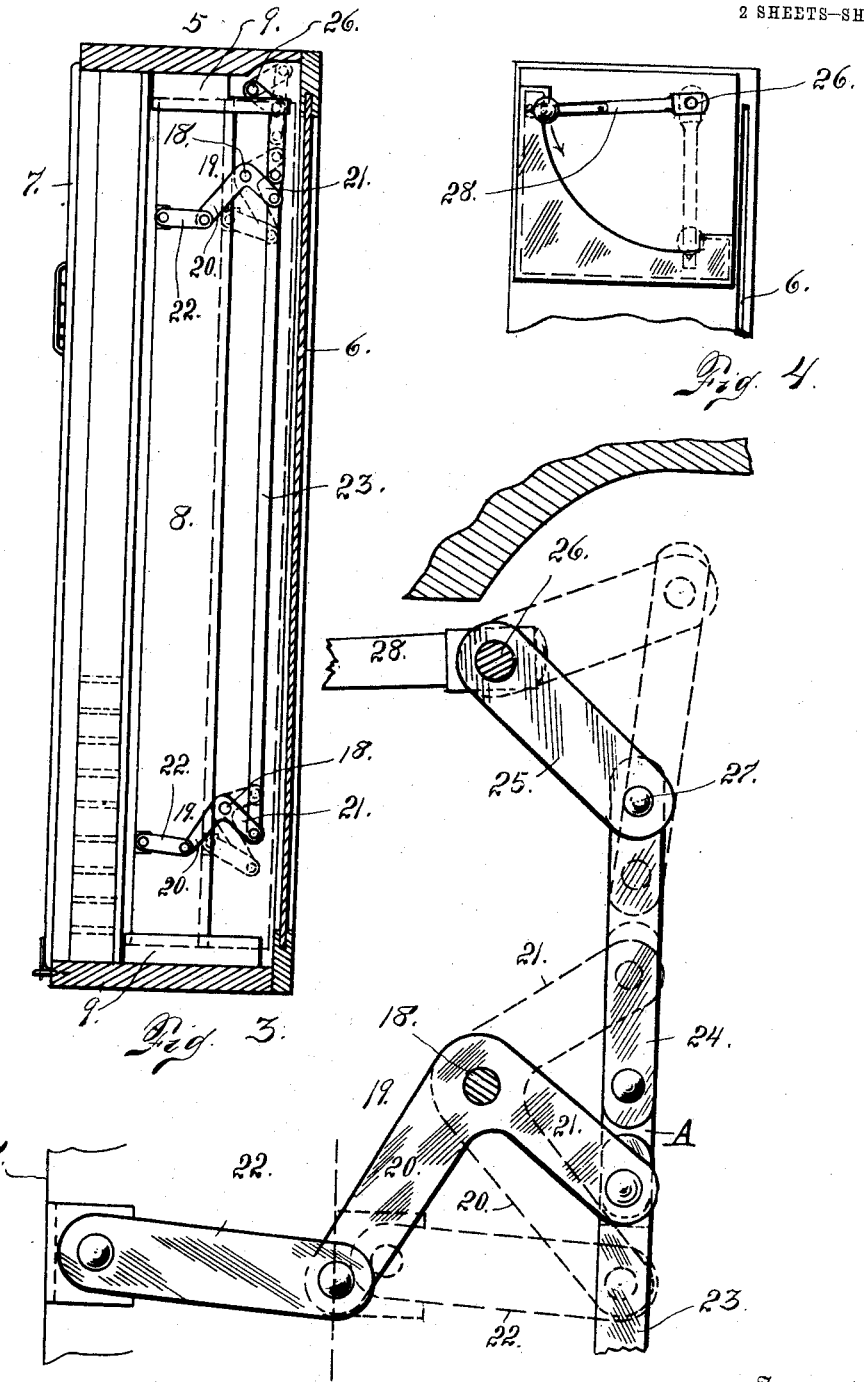

UNITED STATES PATENT OFFICE.

URI M. NORTON, OF DENVER, COLORADO.

SCREEN AND PLATE HOLDER FOR ENGRAVERS' CAMERAS.

982,294. Specification of Letters Patent. Patented Jan. 24, 1911.

Application filed March 20, 1907. Serial No. 363,407.

*To all whom it may concern:*

Be it known that I, URI M. NORTON, a citizen of the United States, residing in the city and county of Denver and State of Colorado, have invented certain new and useful Improvements in Screen and Plate Holders for Engravers' Cameras; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to improvements in a screen and plate holder for engravers' cameras.

My improvements relate more especially to the mechanism for manipulating a screen holder whereby it is adjustable within the casing for the purpose of properly regulating the focus of the lens when the holder is used in connection with a camera.

The invention will now be described in detail reference being made to the accompanying drawing in which is illustrated an embodiment thereof.

Figure 1:
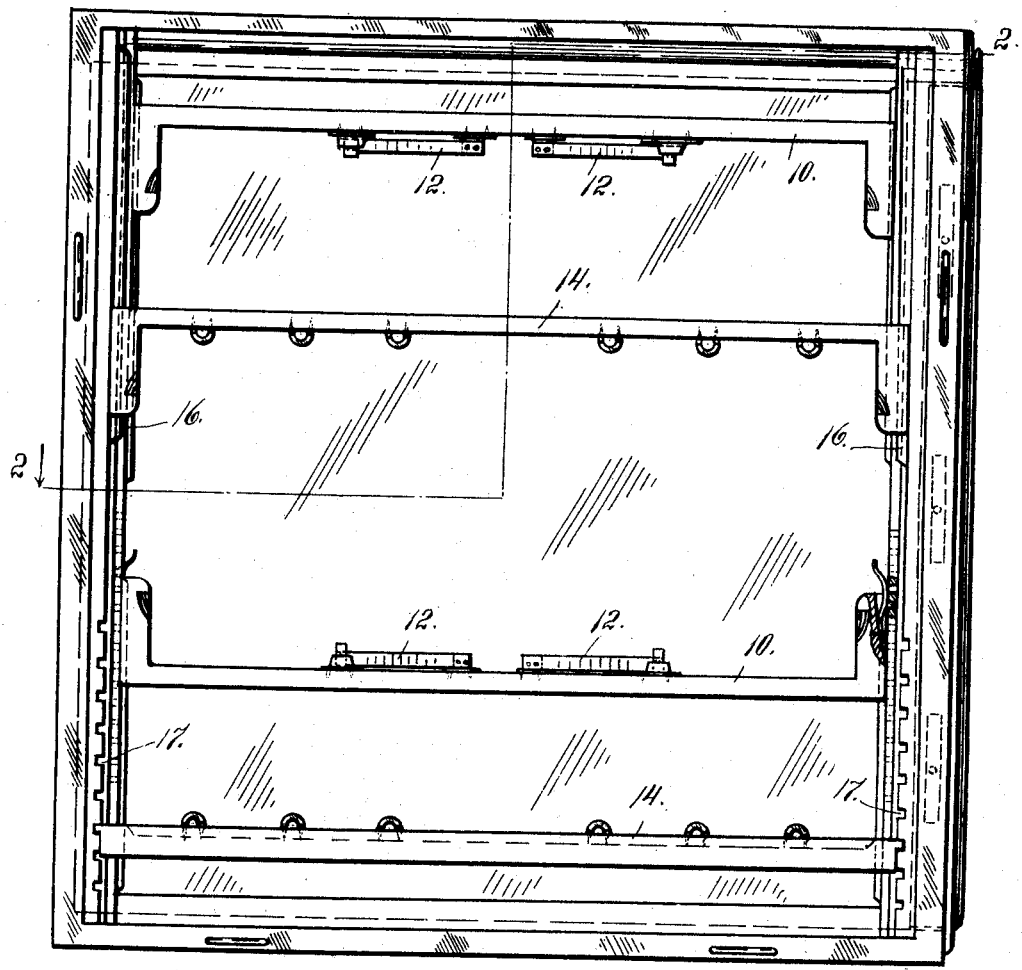
Figure 2:
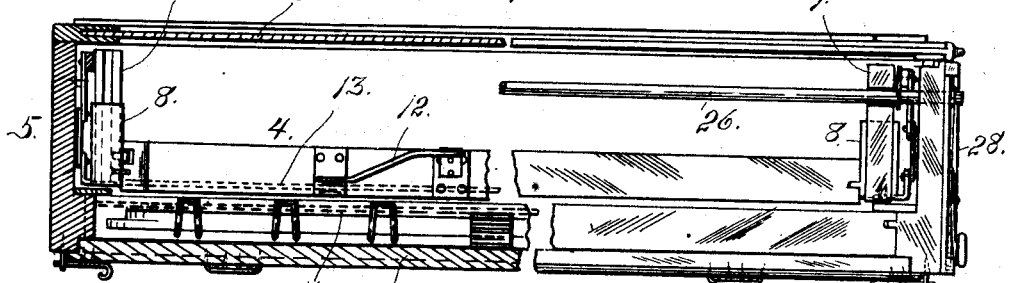

In this drawing, Figure 1 is a rear view of the device with the back plate removed. Fig. 2 is a cross section taken on the broken line 2—2 Fig. 1, showing the back plate in position. Fig. 3 is a vertical section taken through the device with the rear plate removed. Fig. 4 is a side elevation of the upper part of the holder showing the manipulating lever arm. Fig. 5 is an enlarged detail view of a portion of the adjusting mechanism.

The same reference characters indicate the same parts in all the views.

Let the numeral 5 designate the casing closed in front by a removable slide 6, and in the rear by a detachable plate 7. Located within this casing, is a screen holder frame adapted to move back and forth either toward or away from the slide 6, as may be desired in order to obtain the proper focus when the device is used in connection with a camera. This frame may be designated in its entirety by the numeral 4. It consists of vertically disposed side bars 8 whose extremities are tongued to engage ways 9 with which the top and bottom of the casing are provided. Vertically slidable upon these side bars 8 are transverse bars 10 provided with leaf springs 12 for holding the screen 13 in its desired position. This screen is indicated by dotted lines in Fig. 2. The bars 10 are adjustable vertically to harmonize with the size of the screen. The sensitized plate is held in place by two vertically slidable bars 14 located in the casing. The negative is indicated by the dotted lines 15 in Fig. 2. The means for holding the negative has only the vertical adjustment, the upper bar being vertically movable on tongues 16 and the lower bar adjustable by means of recesses 17.

As the mechanism for moving the screen holder back and forth within the casing, constitutes the main feature of my invention, I will not describe the general construction of the device more in detail.

Fulcrumed on each side of the casing as shown at 18, are two bell crank levers 19 each having arms 20 and 21. The arms 20 of the levers are connected by means of links 22 with the side bars 8 of the frame; while the arms 21 of each pair of levers are connected by a vertically disposed rod 23. This rod 23 connects the arms 21 of the two bell crank levers which are located on each side of the casing. To the upper extremity of the rod 23 is also connected a link 24 by means of an intermediate link A and to the upper extremity of the last named link is pivotally connected as shown at 27, a crank 25 made fast to a rock shaft 26 which extends transversely through the casing. One extremity of this shaft protrudes beyond the casing and with it is rigidly connected a lever arm 28 adjustable from the outside. The mechanism for adjusting the screen holding frame is the same on both sides of the casing. The lever arm 28, however, for actuating the rock shaft 26, is not duplicated since there is no necessity therefor.

If we assume that the frame 4 is in the rearmost position which is that shown in Figs. 2 and 3, whereby the screen 13 is brought into suitable proximity with a sensitized plate 15, the lever arm 28 will be in the position shown in Fig. 4 and by full lines in Fig. 5. Now if it is desired to move the screen holder forwardly or toward the slide 6, the lever arm 28 will be moved downwardly or in the direction of the arrow in Fig. 4. This movement of the lever rotates the rock shaft 26, and throws the operating devices to the dotted line position in Figs. 3 and 5, since the crank arm 25 connected with the rock shaft, lifts the link 24, while the latter acting on the rod 23 raises the rod which in turn operates the bell crank lever 19 and the latter acting on the link 22 moves the same forwardly, the parts assuming the dotted line position as heretofore explained.

When the device is in use, a ground glass plate takes the place of the sensitized plate 15, until the proper focus is obtained by adjusting the screen holder toward or away from the plate holder, During this operation for adjusting the screen holder in order to obtain the proper lens focus, the front slide and also the back plate of the device are removed. When the proper focus as indicated on the ground glass is obtained, the said slide and plate are put in position, and the holder is removed from the camera (not shown) and carried to the dark room where the back plate is removed, and a sensitized plate substituted for the ground glass plate. After this has been done, the back plate is again put in place and the holder removed from the dark room and placed in the camera. It will be understood that the adjustment of the screen-holding frame for the purpose of obtaining the proper focus has been maintained during the manipulation of the holder. After this holder has been placed within the camera, the sensitized plate being in place as aforesaid, the slide 6 is pulled out from the front of the frame and left out until there has been a sufficient exposure to produce the desired negative. The slide 6 is then put in position, the holder again carried to a dark room, the negative removed and another sensitized plate put in place after which the holder is closed and the operation heretofore described repeated.

Having thus described my invention, what I claim is:

In a screen and plate holder for engravers' cameras, the combination with a casing, of a plate holder mounted therein, a screen holder mounted to move in a direction perpendicular to the front and rear of the casing, whereby it is made to travel toward or away from the plate holder for obtaining the proper focus, means for moving the said screen holder consisting of vertically disposed rods located on opposite sides of the frame, bell-crank levers each having one arm pivotally connected to the extremity of one of the rods, a link pivotally connecting the other arm with the screen holder, the bell-crank levers being pivotally connected at the angle of their arms to the casing, a transverse rocking shaft provided with laterally extending arms, a link pivotally connecting each of the said laterally extending arms with an extremity of the vertically disposed rods, and an operating lever connected with the extremity of the rock shaft on the outside of the screen, substantially as described.

In testimony whereof I affix my signature in presence of two witnesses.

URI M. NORTON.

Witnesses:
 DENA NELSON,
 MAY GAWLEY.